(No Model.)
W. H. REPASS & J. P. CURRIN.
COMBINED PLOW AND HARROW.
No. 319,621. Patented June 9, 1885.
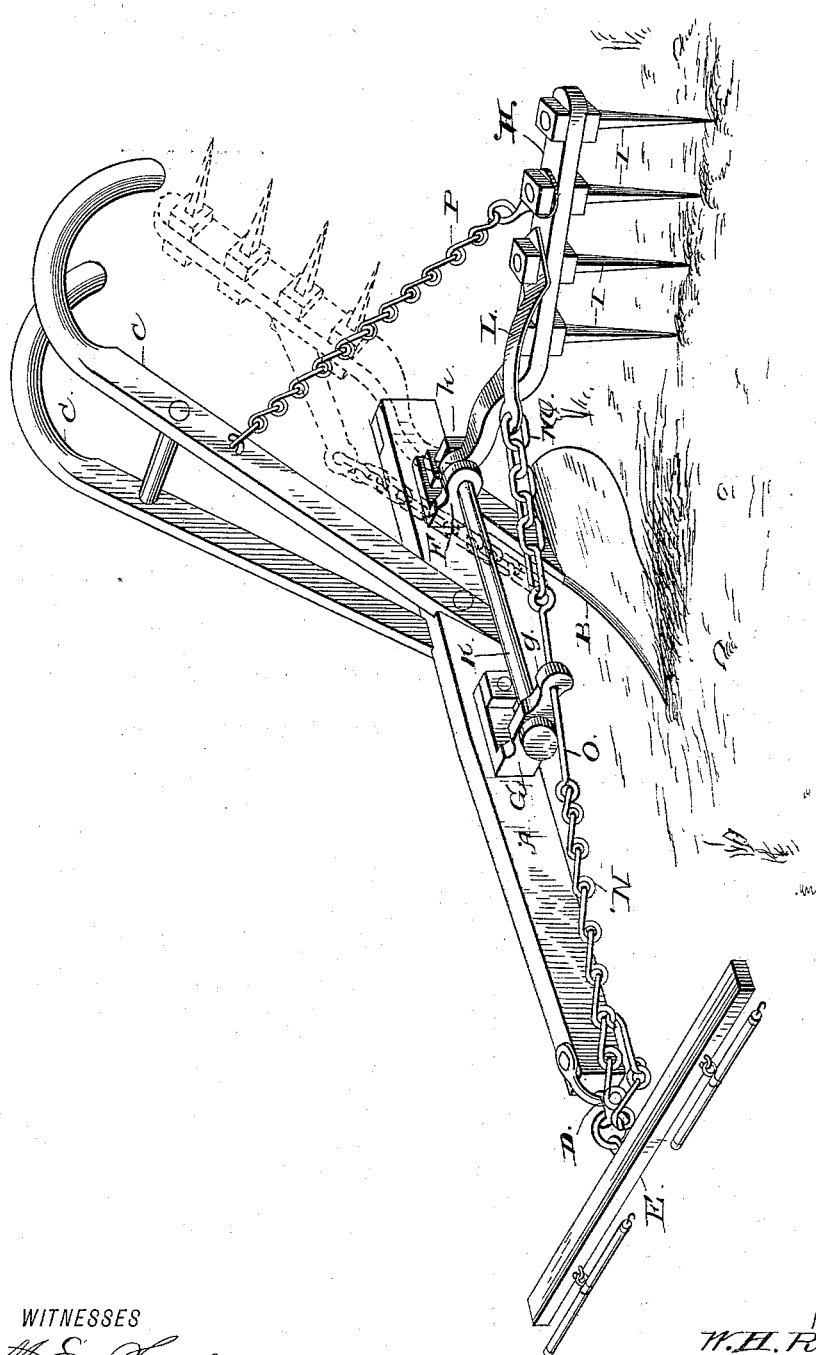
WITNESSES
INVENTORS
W. H. Repass
J. P. Currin
By their Attorneys

UNITED STATES PATENT OFFICE.

WILLIAM HARPER REPASS AND JOHN PHILPOT CURRIN, OF PULASKI STATION, VIRGINIA.

COMBINED PLOW AND HARROW.

SPECIFICATION forming part of Letters Patent No. 319,621, dated June 9, 1885.

Application filed February 26, 1885. (No model.)

*To all whom it may concern:*

Be it known that we, WILLIAM H. REPASS and JOHN P. CURRIN, citizens of the United States, residing at Pulaski Station, in the county of Pulaski and State of Virginia, have invented a new and useful Improvement in Harrows and Plows, of which the following is a specification, reference being had to the accompanying drawings.

Our invention relates to an improvement in combined plows and harrows; and it consists in the peculiar construction and combination of devices that will be more fully set forth hereinafter, and particularly pointed out in the claims.

The accompanying drawing represents our invention in perspective.

A represents a plow-beam, to which is secured a plow, B, in the ordinary manner. C represents the plow-handles, D the clevis, and E the double-tree. On one side of the plow-beam are secured the brackets F and G, which project outwardly from the side of the beam, as shown. The forward bracket, G, has an extension, *g*, which has an opening formed in its outer end.

H represents a harrow-beam, which is of the form shown, and to which is secured the removable harrow-teeth I. This harrow is hinged to the plow-beam by a bolt-rod, K, that passes through the brackets F and G and through the inner end of the harrow-beam. A nut, *k*, is screwed onto the threaded end of the bolt-rod and secures the harrow-beam thereto. By this construction it will be readily understood that the harrow may be swung up against the plow-handle and out of contact with the ground. A tongue, L, is secured to the harrow-beam, and to this tongue is attached a short connecting-chain, M, that is secured to a draft-rod, O, which passes through the extended end of the bracket G. A chain, N, is attached to the front end of the draft-rod O and to the double-tree, as shown. A chain, P, is attached to the harrow-beam and extends up to one of the plow-handles.

When the plow is in operation, the harrow runs by the side of the plow, and thus the two operations of plowing and harrowing are performed simultaneously. By pulling upon the chain P the plowman can raise the harrow so as to clear a stump or other obstruction.

A combined plow and harrow thus constructed is cheap, strong, and simple, and is a very efficient and desirable implement upon a farm.

Having thus described our invention, we claim—

1. The combination of the plow, the brackets F G, bolted to the beam thereof, the bolt K, extending through the brackets, the harrow-beam hinged thereon, and the draft-chain secured to the harrow-beam and to the double-tree, substantially as described.

2. The combination of the plow, the brackets F G, bolted to the beam thereof, the bracket G having the extension *g*, the bolt K, extending through the brackets, the harrow-beam hinged thereon, and the draft-chain secured to the harrow-beam and to the double-tree, and having a rod portion, O, that passes through an opening in the extension *g* of the bracket G, substantially as described.

In testimony that we claim the foregoing as our own we have hereto affixed our signatures in presence of two witnesses.

WILLIAM HARPER REPASS.
JOHN PHILPOT CURRIN.

Witnesses:
VIRGIL O. STUART,
M. J. ALEXANDER.